Figure 1:
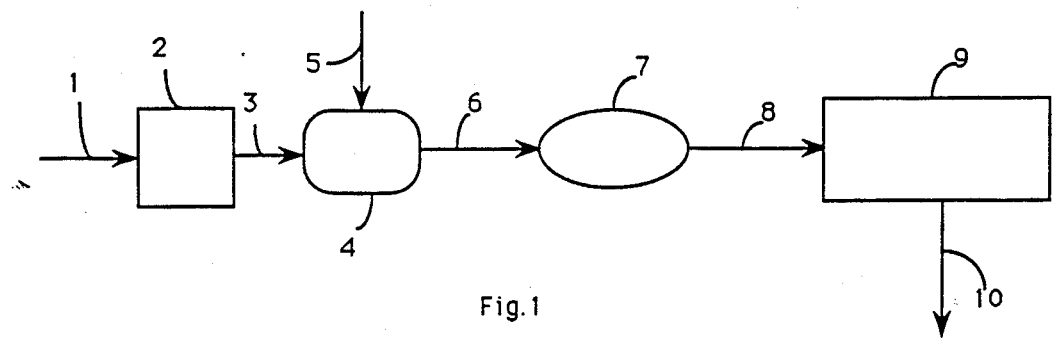

United States Patent [19]

Vanmarcke et al.

[11] Patent Number: 4,943,308
[45] Date of Patent: Jul. 24, 1990

[54] METHOD OF PRODUCING FERTILIZER GRANULES CONTAINING UREA AND AMMONIUM SULPHATE

[75] Inventors: Luc A. Vanmarcke, Lembeke, Belgium; Walter E. Cardon, Sas van Gent, Netherlands

[73] Assignee: Hydro Agri Sluiskil B.V., Sluiskil, Netherlands

[21] Appl. No.: 291,310

[22] Filed: Dec. 28, 1988

Related U.S. Application Data

[63] Continuation-in-part of Ser. No. 227,701, Aug. 3, 1988, abandoned, which is a continuation of Ser. No. 917,165, Oct. 9, 1986, abandoned.

[30] Foreign Application Priority Data

Oct. 17, 1985 [NL] Netherlands .................... 8502838

[51] Int. Cl.$^5$ .................... C05C 3/00; C05C 9/00
[52] U.S. Cl. .................... 71/29; 71/30; 71/64.05; 71/64.13
[58] Field of Search .................... 71/28–30, 71/64.01–64.05, 64.13

[56] References Cited

U.S. PATENT DOCUMENTS

| | | | |
|---|---|---|---|
| T101,803 | 5/1982 | Jones et al. | 71/30 |
| 3,475,132 | 10/1969 | Seifert et al. | 23/259.1 |
| 3,785,796 | 1/1974 | Mann, Jr. | 71/28 |
| 3,928,015 | 12/1975 | Siegel et al. | 71/28 |
| 4,033,747 | 7/1979 | Young | 71/30 |
| 4,219,589 | 8/1980 | Niks et al. | 427/213 |
| 4,239,522 | 12/1980 | Wilson et al. | 71/29 |
| 4,388,101 | 6/1983 | Lowder | 71/29 |
| 4,478,632 | 10/1984 | Van Hijfte et al. | 71/29 |
| 4,500,336 | 2/1985 | Van Hijfte et al. | 71/29 |

FOREIGN PATENT DOCUMENTS

| | | |
|---|---|---|
| 1157288 | 11/1983 | Canada . |
| 635080 | 11/1978 | U.S.S.R. . |
| 810760 | 3/1959 | United Kingdom . |

OTHER PUBLICATIONS

Ind. Eng. Chem., Process Des. Dev. 14 (1975), 269–276.

*Primary Examiner*—Ferris H. Lander
*Attorney, Agent, or Firm*—Scully, Scott, Murphy & Presser

[57] ABSTRACT

The invention concerns a method of producing fertilizer granules containing urea and ammonium sulphate by granulating a mixture containing urea, ammonium sulphate and water, which is characterized in that the ammonium sulphate is completely dissolved in an aqueous urea solution with a urea concentration of 70–85% by weight, the resulting solution is thickened to a dry content of 92–97% by weight, with a granulation additive for the urea being added in any stage of the treatment, following which the thickened solution is granulated in a fluidized bed of urea and ammonium sulphate containing nuclei.

6 Claims, 1 Drawing Sheet

METHOD OF PRODUCING FERTILIZER GRANULES CONTAINING UREA AND AMMONIUM SULPHATE

CROSS-REFERENCE TO RELATED APPLICATIONS

This application is a continuation-in-part of application Ser. No. 227,701, filed Aug. 3, 1988, now abandoned, which is a continuation of application Ser. No. 917,165, filed Oct. 9, 1986, now abandoned.

The development and production of good nitrogen and sulphur containing fertilizers is at present of great importance. In former years, ammonium sulphate (21% N, 24% S) was the most important nitrogen-containing fertilizer, and the phosphate fertilizer generally used was superphosphate (20% $P_2O_5$, 12% S). Dressings with these substances gave the soil more sulphur than was needed for the crop. Over the years, however, ammonium sulphate was displaced by urea (46% N, 0% S) and superphosphate by monoammonium phosphate (12% N, 61% $P_2O_5$, 0% S), diammonium phosphate (21% N, 53% $P_2O_5$, 0% S) and triple superphosphate (46% $P_2O_5$, 0% S). Owing to the use of these sulphur-free fertilizers, the sulphur content of the soil decreased, if no separate sulphur dressings were given, because sulphur was removed from the field with every harvest of the crop, while in addition sulphur was lost from the soil from leaching-out processes. The result is that in many parts of the world the soil exhibits at present a serious shortage of sulphur, which for many crops is extremely harmful.

There is, therefore, a great need of fertilizers which contain sufficient sulphur in a form that is readily taken up by plants.

It is known for urea granules to be provided with a coating of elemental sulphur. In this form, however, sulphur is not taken up by the crop. The elemental sulphur must first be converted into sulphate in the soil, and this conversion proceeds very slowly.

A better sulphur supplier is ammonium sulphate, which makes the sulphur available in a form that can be directly taken up by plants. By itself, ammonium sulphate is less attractive as a fertilizer for fertilizing purposes by reason of its relatively low nitrogen content (21%) and its high sulphur content, but by combining ammonium sulphate with urea in various ratios, it is possible to produce fertilizers with nitrogen and sulphur concentrations suited to specific requirements of crops. Thus, for example, by combining the two components in a urea/ammonium sulphate weight ratio of about 4/1, a fertilizer can be obtained which contains about 40% N and about 5% S, and is very suitable for many fertilizing purposes.

Ind. Eng. Chem., Process Des. Dev. 14 (1975) 269-276 describes the production, on a pilot-plant scale, of urea and ammonium sulphate containing fertilizer granules by pan granulation and by prilling mixtures of a highly concentrated urea solution (about 99%) and ammonium sulphate. The ammonium sulphate is added in solid form to the substantially anhydrous urea melt, but is only partially soluble therein, so that the urea and ammonium sulphate containing melt must be granulated or prilled at a high temperature (135°-150° C.) to limit the proportion of undissolved ammonium sulphate in the melt as much as possible. At lower temperatures the melt contains so much undissolved material that it cannot be properly processed into granules. Higher temperatures cannot be used in connection with decomposition of the urea. By reason of the limited solubility of ammonium sulphate in the urea melt, the methods described are unsuitable for implementation on an industrial scale.

In an aqueous urea solution, ammonium sulphate is considerably better soluble than in a substantially anhydrous urea melt. Aqueous urea solutions can be processed into granules in the manner described in U.S. Pat. No. 4,219,589, in which an aqueous urea solution, to which a crystallization retarder for the urea has been added, is sprayed in the form of very fine droplets with an average diameter of less than 120 $\mu$m into a fluidized bed of urea granules at a temperature at which the water evaporates from the solution sprayed onto the nuclei, and urea crystallizes on the nuclei to form granules having the desired sizes.

The aqueous urea solution which is granulated in the method described in U.S. Pat. No. 4,219,589 preferably has a urea concentration of 92-97% by weight, specifically 94-96% by weight, and is sprayed into the fluidized bed at a temperature of 110°-125° C. Ammonium-sulfate is considerably better soluble in such solutions than in a substantially anhydrous urea melt, it is true, but not in a proportion that is interesting for fertilizing purposes, and a portion of the ammonium sulfate remains suspended in the solution in the solid state.

In U.S. patent specification No. 4,500,336 one of the examples is directed to the preparation of fertilizer granules, containing urea and ammoniumsulfate. In this process the ammonium sulfate is added in the form of ground solids. Due to the limited solubility of ammonium sulfate in aqueous urea-solution, a suspension or slurry of ammonium sulfate particles in aqueous urea is formed. In order to prevent problems with the granulation thereof it is necessary to feed this slurry to a colloid-mill to comminute the particles.

Especially at higher sulfate-contents, such as 30–40 wt.% of ammoniumsulfate, granule build-up in the bed becomes more difficult, and the weight ratio of off-size product to on-size product is less favorable compared with those obtained with pure urea. Furthermore, the granules become less round and less smooth, so that they are more sensitive to abrasion. Dust emission from the granulator, i.e., the fine solid material entrained by the air of fluidization exiting from the granulator, which is partly trapped in cyclones, is rather high and contains a much higher percentage of ammonium sulphate than the final product.

An investigation into the cause of these unfavorable results revealed that, in spite of colloid milling, the solid ammonium sulphate in the suspension did not have the expected degree of fineness and uniformity. The resulting lack of uniformity and of sufficient fineness in the solid material in the suspension explains the obtained granulation results.

Although this process has made it possible to prepare urea and ammoniumsulfate containing granules with at that time satisfactory results, the requirements of the industry and the user have increased, thus making it necessary to develop processes that are more optimal in product properties and/or processing economy.

It has now been found that a considerable improvement in granulation results can be obtained if, in accordance with the invention, the ammonium sulphate is completely dissolved in an aqueous urea solution with a urea concentration of 75-85% by weight, preferably 78-82% by weight, the resulting solution is concentrated to a dry content of 92-97% by weight, preferably 94-96% by weight, with a granulation additive (crystallization retarder) for the urea being added in any stage of the treatment, following which the concentrated solution is granulated in a fluidized bed of urea and ammonium sulphate containing nuclei.

It was to be expected that the ammonium sulphate would be completely dissolved in a urea solution containing 15-25% by weight of water. It was also to be expected, however, that, during the concentrating of the solution the ammonium sulphate would again be crystallized at a urea concentration above 90% by weight, and then during granulation cause the same problems as does the colloid milled sulphate. Surprisingly, however, it was found that this is not the case and that the concentrated solution can be granulated in the manner described in U.S. Pat. No. 4,219,589 without particular problems.

In the process of the invention, the ratio "on-size"/"off-size" in the product coming from the granulator is much more favorable than in the product prepared in accordance with the teachings of U.S. patent specification No. 4,500,336. Furthermore, the dust formation is decreased and the ratio ammonium-sulfate/urea in the dust corresponds better to the ratio thereof in the feed. This means that the loss of especially ammonium sulfate is reduced and that the composition of the product can be made more uniform.

It is remarked that the solubility of ammonium sulphate varies from 30 wt.% in a 70 wt.% solution, 20 wt.% in a 80 wt.% urea solution, 16 wt.% in 90 wt.% urea solution to 12 wt.% in a 95 wt.% aqueous urea solution.

It is not possible to determine what effects occur in the hot, highly concentrated solution during the last stages of the thickening process. It is possible that the ammonium sulphate remains in solution (supersaturated solution), but it is also possible that the sulphate is crystallized in such a fine form that it does not interfere with granulation. It is a fact that after reaching the desired final concentration the solution is excellently suitable for being granulated in the manner described in U.S. Pat. No. 4,219,589.

To carry out the method according to the invention, the ammonium sulphate can be dissolved in the urea solution that is a product of the synthesis of urea and has a urea concentration of 75-85% by weight, preferably 78-82% by weight, for example of about 80% by weight, preferably in such a proportion that the weight ratio of urea/ammonium sulphate in the resulting solution ranges between 2.4/1 and 7/1, in particular between 3/1 and 5/1, whereafter the solution can be evaporated in the usual way to a dry content of 92-97% by weight, preferably of 94-96% by weight, for example, of 95% by weight. Following this, the concentrated solution is transferred to a fluidized bed granulator, in which it is granulated.

Prior to granulation a granulation additive (crystallization retarder) for urea is added to the solution in any stage of the pre-treatment, that is to say, before, during, or after the addition of the ammonium sulphate, or before, during or after the thickening to the desired final concentration. Suitable additives for urea are water-soluble addition and condensation products of urea and formaldehyde (U.S. Pat. No. 4,219,589), magnesium oxide as such or in the form of selectively or completely calcined dolomite (Canadian patent No. 1,157,288), magnesium hydroxide and water-soluble inorganic magnesium salts (U.S. Pat. No. 4,478,632), and water-soluble inorganic aluminum salts (U.S. Pat. No. 4,500,336). The proportion of the additives preferably ranges between 0.1 and 2.0% by weight, calculated on the final product.

Preferably, an aluminum compound is used, such as aluminum sulphate, in a proportion of 0.1 to 1.0% by weight.

The granulation of the concentrated solution containing a crystallization retarder for the urea can be carried out under conditions disclosed in U.S. Pat. No. 4,219,589, which is incorporated herein by reference. Granulation proceeds without any problems, and granule build-up is excellent. As compared with the granulation of a urea solution in which the ammonium sulphate has been colloid milled, the weight ratio of off-size product to on-size product is much more favorable, dust emission from the granulator is considerably lower, and the emission contains less sulphate. As a result, less dust needs to be washed out from the air exiting from the granulator, and accordingly there is less washing liquid that has to be thickened for it to be re-used as a starting material.

The granules obtained by the method according to the invention contain a homogeneous dispersion of very finely divided ammonium sulphate in urea. They possess excellent mechanical characteristics, have a smooth, round surface, do not exhibit any caking tendency, and can be dumped and transported in bulk without any problems.

The invention accordingly also relates to urea and ammonium sulphate containing granules prepared in accordance with the process of the invention and containing 15 to 30% by weight of ammonium sulphate, 0.1 to 2.0% by weight of crystallization retarder, and further essentially urea and possibly up to 0.5% by weight of water, which granules contain the ammonium sulphate in very finely divided form and in homogeneous dispersion.

Figure 2:
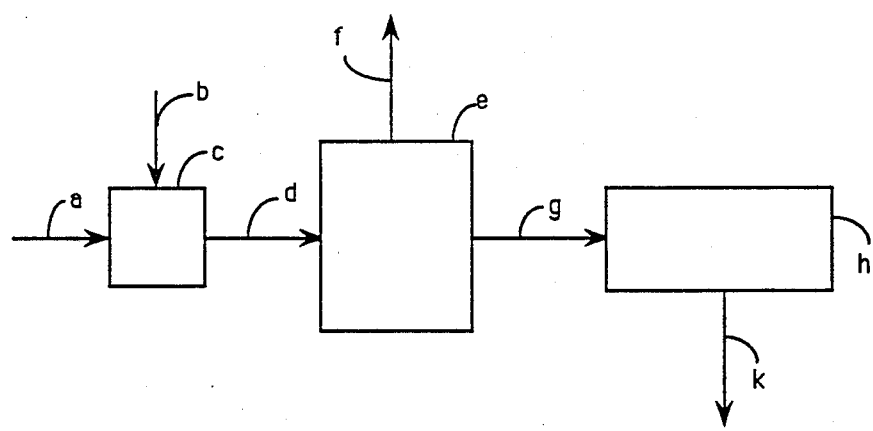

In the FIGS. 1 and 2 a comparison is given of the prior art process and the process of the present invention.

In FIG. 1 the prior art process is elucidated, whereas in

FIG. 2 the process of the present invention is given.

In FIG. 1 a dilute solution of urea in water is fed through line 1 into evaporator 2, wherein the solution is concentrated to a urea content of 85-98% as described in U.S. Pat. No. 4,500,336.

This concentrated solution is fed via line 3 to mixer 4, wherein finely divided ammoniumsulfate is added in an amount exceeding the solubility thereof in the urea solution. Although part of the ammoniumsulfate particles dissolve in the mixer, the main part thereof remains undissolved. As is common in dissolving processes, the small particles dissolve, whereas the larger particles remain undissolved, thus leaving the relatively course fraction of the ammoniumsulfate as suspended particles in the urea solution.

The thus obtained suspension is subsequently fed to colloid mill 7, via line 6. In this colloid mill the particles are made sufficiently fine to be granulated in a conventional manner.

The suspension is then fed via line 8 to granulator 9, wherein the suspension is converted to granules having the required size. After sieving, the product fraction is fed through line 10 to a storage facility (not shown).

The process of the invention, as shown in FIG. 2, also starts with a dilute urea solution, with a urea content of 70–85 wt. T, which is fed through line a to dissolving unit c, wherein the finely divided ammonium-sulfate, fed through line 1 line b, is completely dissolved in the urea solution. This solution, which contains substantially no solid particles, is fed through line d to evaporator e, wherein the solution is concentrated to a dry content of 92–97 wt.%. During this concentration the ammoniumsulfate remains substantially in solution, or, at the most, forms a minor amount of colloidal particles in the liquid. The thus obtained concentrated liquid is fed through line g to granulator h, which is identical to the granulator 9 as described in relation to FIG. 1. The product is obtained through line k and fed to storage facilities (not shown).

It is remarked, that in the process of the present invention the concentrated liquid, that is to be granulated, has all properties of a liquid, and not of a suspension. Even though the ammoniumsulfate may have crystallized to some degree, due to the short residence time in the installation, the crystals formed, if any, are not able to grow to such a size, that they influence the behavior of the liquid. Thanks to this, there are no problems with the granulation, whereas also the granule build up is quite improved over the prior art.

EXAMPLE

Aqueous mixtures of urea and ammonium sulphate were granulated in two experiments conducted as continuous processes.

EXPERIMENT 1 (COMPARATIVE)

To an aqueous urea solution, with a urea concentration of 95% by weight and a temperature of about 140° C., aluminum sulphate was added as a crystallization retarder for the urea and a quantity of ammonium sulphate. The ammonium sulphate was partially dissolved. The non-dissolved part was ground in the solution by means of a colloid mill. The suspension thus treated was supplied to a granulator containing a fluidized bed of urea and ammonium sulphate containing nuclei, into which it was sprayed in the form of droplets having an average diameter of less than 120 μm. The conditions in the fluidized bed were controlled so that a bed temperature of about 112°–114° C. was maintained. A quantity of granulate was continuously removed from the granulator and cooled in a fluidized-bed cooler. Subsequently the granulate was separated by screens into an on-size fraction (2–5 mm dia.), which was recovered as a final product, an oversize fraction, and an undersize fraction. The oversize fraction was ground and together with the undersize fraction recycled to the fluidized bed to function as nuclear material therein.

EXPERIMENTS 2–4 (ACCORDING TO THE INVENTION)

To aqueous urea solutions having various urea concentrations, aluminum sulphate was added as a granulation additive (crystallization retarder) for urea and an amount of ammonium sulphate. The ammonium sulphate was completely dissolved. The resulting solution was thickened to a dry content of 95% by weight and then transferred to a fluidized bed granulator, into which it was sprayed. Granulation and granulate treatment were effected in the same way as described in Experiment 1.

The numerical data concerning the two experiments are specified in the following table.

TABLE

| | Experiment | |
|---|---|---|
| | 1 (comparative) | 2 (according to the invention) |
| Starting materials Urea solution | | |
| concentration % by wt. | 95 | 80 |
| temperature, °C. | 140 | 120 |
| rate, kg/hr | 3978 | 5145 |
| Ammonium sulphate, kg/hr | 1071 | 1054 |
| Granulation additive $Al_2(SO_4)_3$, kg/hr | 47.5 | 57 |
| Granulate | | |
| total, kg/hour | 7500 | 7200 |
| On-size, kg/hour | 4500 | 5020 |
| Undersize, kg/hour | 2980 | 2100 |
| Oversize, kg/hour | 20 | 80 |
| Undersize + oversize relative to on-size, % | 66.6 | 43.4 |
| Emission | | |
| urea, kg/hr | 220 | 150 |
| ammonium sulphate, kg/hr. | 180 | 60 |
| weight ratio urea/ ammonium sulphate | 1.2 | 2.5 |
| final product | | |
| urea, % by weight | 79.1 | 79.0 |
| ammonium sulphate, % by weight | 19.8 | 19.8 |
| weight ratio urea/ ammonium sulphate | 4.0 | 4.0 |
| average diameter, mm | 2.30 | 2.80 |
| % N | 41 | 41 |
| % S | 4.8 | 4.8 |

| | Experiment | |
|---|---|---|
| | 3 | 4 |
| starting materials urea solution | | |
| concentration, % | 80 | 72 |
| temperature °C. | 120 | 100 |
| rate, kg/h | 5150 | 4150 |
| ammonium sulphate, kg/h | 1060 | 1166 |
| $Al_2(SO_4)_3$, kg/h | 100 | 42,5 |
| granulate | | |
| total kg/h | 6607 | 6054 |
| on-size, kg/h | 5130 | 4039 |
| under-size, kg/h | 1357 | 1940 |
| over-size, kg/h | 120 | 75 |
| u. + o/on-size % | 28,8 | 49,9 |
| emissions | | |
| urea, kg/h | 120 | 160 |
| AS, kg/h | 48 | 75 |
| ratio U/A | 2,5 | 2,2 |
| final product | | |
| humidity, % | 0,3 | 0,2 |
| urea, % | 78,0 | 71,7 |
| AS % | 19,7 | 27,0 |
| ratio U/AS % | 4,0 | 2,7 |
| $Al_2(SO_4)_3$, % | 2 | 1 |
| % N | 41 | 38 |
| % S | 5,0 | 7,0 |
| average diameter, mm | 3,05 | 2,85 |
| Remarks | no caking | no caking |

We claim:
1. A method of producing fertilizer granules containing urea and ammonium sulphate with 15–30 wt.% of ammonium sulphate calculated on the amount of urea and ammonium sulphate by granulating a mixture containing urea, ammonium sulphate and water, characterized in that the ammonium sulphate is completely dissolved in an aqueous urea solution with a urea concentration of 75–85% by weight, the resulting solution is thickened to a dry content of 92–97% by weight, with a granulation additive for the urea being added in any stage of the treatment, following which the thickened solution is granulated in a fluidized bed of urea and ammonium sulphate containing nuclei.

2. A method as claimed in claim 1, characterized in that the ammonium sulphate is dissolved in an aqueous urea solution having a urea concentration of 78–82% by weight, and the resulting solution is thickened to a dry content of 94–96% by weight.

3. A method as claimed in claim 1, characterized in that the proportion of granulation additive is 0.1 to 2.0% by weight, calculated on the quantity of urea and ammonium sulphate.

4. A method as claimed in claim 2, characterized in that the proportion of granulation additive is 0.1 to 2.0% by weight, calculated on the quantity of urea and ammonium sulphate.

5. A method as claimed in claim 3, characterized by using as the granulation additive an aluminum compound.

6. A method as claimed in claim 4, characterized by using as the granulation additive an aluminum compound.

* * * * *